Feb. 25, 1941.  O. N. BRYANT  2,232,838
GOVERNOR APPARATUS
Filed April 30, 1938
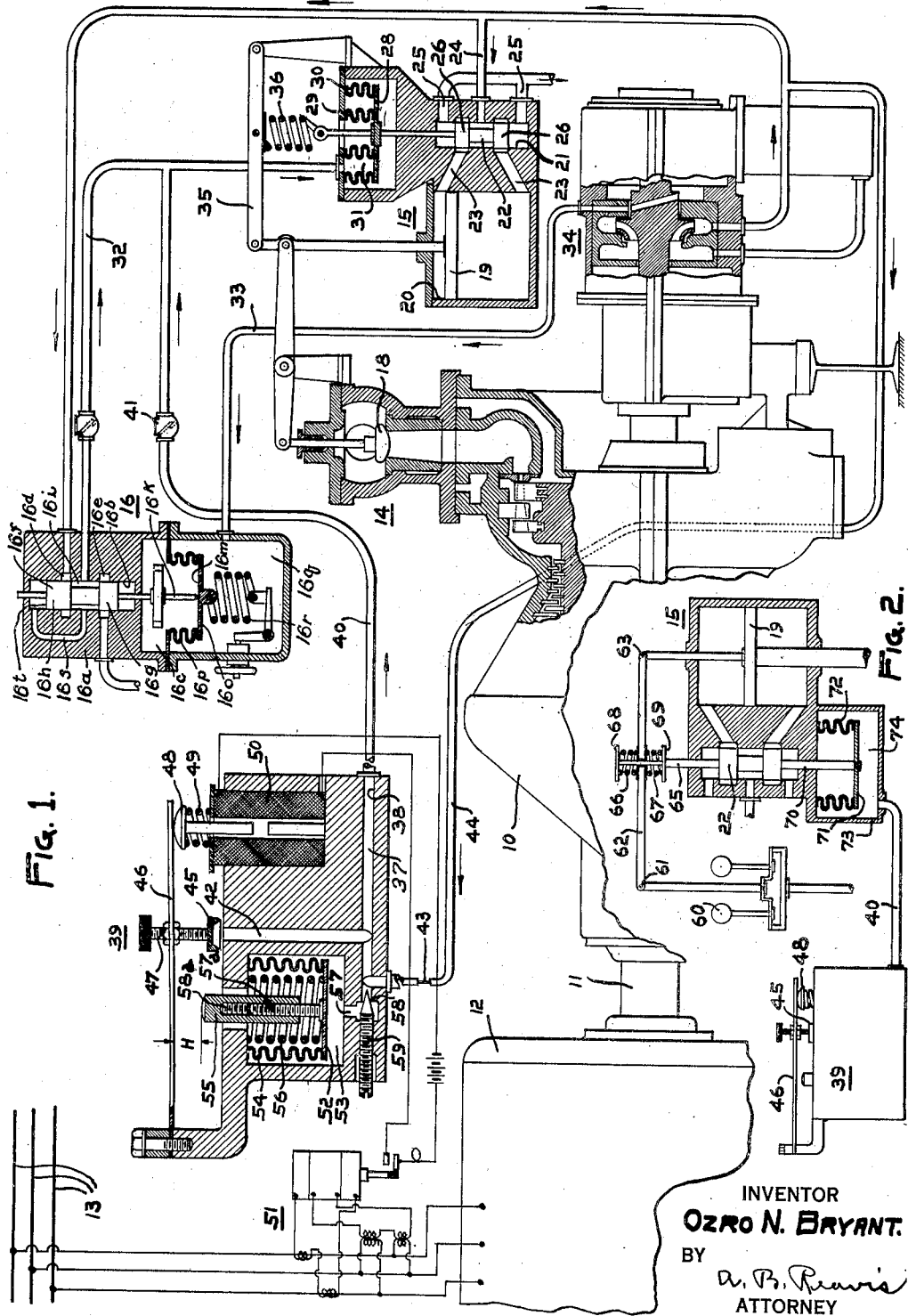
INVENTOR
*Ozro N. Bryant.*
BY
*a. B. Reavis*
ATTORNEY Patented Feb. 25, 1941

2,232,838

UNITED STATES PATENT OFFICE 2,232,838

GOVERNOR APPARATUS

Ozro N. Bryant, Prospect Park, Pa., assignor to Westinghouse Electric & Manufacturing Company, East Pittsburgh, Pa., a corporation of Pennsylvania Application April 30, 1938, Serial No. 205,238

10 Claims. (Cl. 264—14)

My invention relates to prime movers with fluid pressure governors and it has for an object to provide means operating in conjunction therewith to hasten the operation of the governor.

Where a steam turbine operates a generator connected to an electrical system, under certain circumstances, it may be desirable to provide for electrical tripping of the governor so that the turbine load may be reduced suddenly to any predetermined value from whatever load it happens to be carrying, the purpose of this arrangement being to prevent undesired opening of circuit breakers in case of sudden load drop. Accordingly, I provide in conjunction with a governing system, means effective, upon the occurrence of the predetermined load condition, to provide a force for moving the pilot valve to an extreme position and for holding it there during an interval suitable to secure quick closing operation of the governor until a predetermined load is reached.

A further object of my invention is to provide a prime mover having motive fluid supplied thereto under control of a governing system together with means operative in case of sudden drop in load to cause rapid valve closing movement of the governor.

A further object of my invention is to provide a prime mover having motive fluid supplied thereto under control of governing mechanism normally responsive to fluid supplied thereto under pressure varying as a function of the prime mover speed together with means for supplying fluid under different pressure thereto.

A further object of my invention is to provide a turbine having a governor control admission valve together with apparatus operative in response to sudden drop in load to supersede the effect of the governor and cause rapid movement of the admission valve in a closing direction until a predetermined fractional turbine load is reached whereupon control of the turbine by the governing system is resumed.

These and other objects are effected by my invention as will be apparent from the following description and claims taken in connection with the accompanying drawing, forming a part of this application, in which:

Fig. 1 is a diagrammatic view with parts shown in section and to exaggerated scale illustrative of my invention; and Fig. 2 shows diagrammatically an alternative arrangement.

Referring to the drawing more in detail, in Fig. 1, the turbine 10 has its spindle 11 connected to the rotor of the generator 12 arranged to supply electrical energy to the system, diagrammatically indicated at 13. The turbine has an admission valve, at 14, operated by a servo-motor, at 15, the latter being controlled by governing apparatus, for example, the transformer governor, at 16.

The admission valve, at 14, includes one or more movable valve elements 18 connected by suitable linkage to the operating piston 19 in the operating cylinder 20 of the servo-motor or governor relay, at 15, the latter also including the piston valve cylinder 21, with a piston valve 22 therein. The admission ports 23 connect the cylinders and the piston valve cylinder is provided with a motive fluid supply port 24 and exhaust ports 25, the piston valve having lands 26 cooperating with the ports upon movement of the valve to secure operation of the servo-motor in the usual way.

The piston valve 22 is connected to the movable pressure abutment 28 cooperating with bellows elements 29 and 30 to provide an expansible chamber 31, the latter being supplied with fluid under regulating pressure by means of the conduit or passage 32 connected to the transformer governor, at 16, having fluid under controlling pressure, varying as a function of the turbine speed, supplied thereto by the conduit or passage 33 from the reversed-flow impeller, at 34, the latter being more particularly disclosed and claimed in my Patent No. 2,035,689, March 31, 1936.

As shown, the transformer includes a body 16a having a cylinder 16b and a lower space 16c. The cylinder has pressure supply and exhaust ports 16d and 16e normally just lapped by the lands 16f and 16g, respectively, of the piston valve 16h. Between the lands, the piston valve has a reduced portion cooperating with the cylinder to define a regulating pressure space 16i in communication with the regulating pressure supply line 32.

If the piston valve 16h is moved upwardly from its neutral position illustrated, the regulating pressure space 16i will be placed in communication with the pressure port 16d to bring about increase in regulating pressure; and, if moved downwardly, the space will be placed in communication with the exhaust or drain port 16e to decrease the regulating pressure. Referring now to the forces acting on the piston valve to effect variation in the regulating pressure, the piston valve has a stem 16k extending into the lower space 16c and having its lower end engaging the abutment 16m joined by a bellows 16p to the body 16a so as to define the pressure chamber 16q, the abutment 16m having a piston area 16o forming a part of the boundary surface of the pressure chamber. A spring 16r exerts its force on the abutment 16m in opposition to the force of fluid pressure supplied to the chamber 16q by means, for example, of the reversed flow impeller device, at 34, for giving a governing pressure which varies as a function of the turbine speed. The body 16a has a passage 16s establishing communication of the regulating pressure space 16i with the upper end of the cylinder 16b so that the force of regulating pressure acts on the top piston area 16t of the piston valve.

From the structure described, it will be apparent that change in governing pressure supplied by the conduit 33 to the pressure chamber 16q results in movement of the piston valve, reduction in such pressure causing the piston valve to move downwardly and increase in such pressure causing the valve to move upwardly. If there is an increase in load and decrease in speed, the governing pressure will decline and the piston valve will move downwardly to place the regulating pressure space 16i in communication with the drain port, whereby the regulating pressure will be reduced, this reduction in regulating pressure continuing and the force thereof acting on the piston area 16t becoming less and less until the reduced force acting on the latter area is equal to the reduction in force of governing pressure acting on the area 16o, at which time the piston valve is restored to neutral position. On the other hand, with decrease in load and increase in speed, the governing pressure will increase, causing the piston valve to move upwardly to increase the regulating pressure, the latter pressure increasing until the change in force thereof acting on the piston area 16t balances the change in force acting on the piston area 16o.

The operating piston 19 is connected to the pilot valve 22 by means of suitable follow-up mechanism including, for example, the lever 35 and the spring link 36, the force of the spring link opposing that of fluid pressure acting on the abutment 28; and, upon movement of the piston valve due to change in regulating pressure, the resulting movement of the operating piston brings about a change in the spring force until equilibrium of the spring and regulating pressure forces acting on the piston valve is restored with the latter in neutral position.

Under certain circumstances, for example, to avoid opening of circuit breakers, it may be desirable to trip the governor so that the load can be reduced to a predetermined value from whatever load the turbine happens to be carrying. While the governor illustrated is quite rapid, the relay or pilot valve, as is customary, closes gradually as the operating piston moves in going from one load condition to another with the result that the action is not so rapid as it would be if the pilot valve could be kept wide open. Accordingly, I provide, in connection with the customary governing system including a governor, its relay, and the admission valve, auxiliary equipment, at 39, responsive to rate of change of sudden decline in load to move the relay piston valve to extreme position and to keep it there for actuation of the relay operating piston to close the admission valve. Also, the auxiliary equipment is arranged to provide for opening the admission valve suitably to the final load, the equipment including means for timing its operation suitably to the operating rate of the governing system. Thus, by having the auxiliary equipment assume control only for these opening and closing events, the effect is secured of a relatively much more rapid governing system, that is, a system that has the extreme degree of rapidity under conditions requiring rapid action.

Fluid under pressure which is considerably higher than the normal regulating pressure is temporarily supplied to the expansible chamber 31 by means of the temporary pressure space, at 37, from the auxiliary apparatus, at 39, the temporary pressure space including the communicating passages 38 and 40.

The temporary pressure space, at 37, of the auxiliary apparatus, at 39, has a check valve 41 opening toward the expansible chamber 31, a relief port 42, and an orifice 43 for supplying liquid thereto from the passage 44. A relief valve 45, preferably of the cup type, cooperates with the port 42, the valve 45 being biased normally to closed position by means of a cantilever spring 46, the closing force exerted on the cup valve being adjustable by means of the threaded stem 47.

With the cup valve 45 closed, pressure will build up in the temporary pressure space, at 37, to a point determined by the spring pressure exerted on the cup relief valve. Accordingly, if the cup valve is allowed to act in this manner, the consequent pressure rapidly building up in the temporary pressure space, at 37, will be effective to move the pilot valve 22 in such a direction as to bring about movement of the admission valve 18 in a closing direction.

The cup valve 45 is normally maintained in open position by means of the abutment 48 sustained for this purpose by the spring 49. A solenoid 50 controlled from the load-responsive device, at 51, is effective, upon a rapid drop in load, to withdraw the abutment 48 against the force of the spring 49, whereupon the cantilever spring 46 moves the relief cup valve to closed position with loading dependent upon adjustment of the threaded stem 47 and the consequent temporary and higher pressure created in the space, at 37, is effective to bring about rapid closing operation of the governor. In operation, the load spring 46 is adjusted for such loading that the temporary pressure will be sufficiently high as to be well above the maximum pressure of the governor regulating pressure range, the latter having its minimum for full load and its maximum for minimum or no load, so as to move the relay piston valve to its extreme position and to hold it in that position to actuate the relay to close the admission valve.

After closure of the admission valve, the temporary pressure in the space, at 37, is reduced in value to a desired point within the regulating pressure range so that the reduced temporary pressure, in cooperation with the follow-up spring 36, may open the admission valve to a position suitable to the final load reached at the end of the load drop, whereupon the solenoid 50 will be deenergized and the cup valve 45 will be moved to open position to terminate the temporary pressure. Thus, the temporary pressure period is made up of two phases, first, a high pressure phase to close the admission valve, and then, a lower pressure phase to open the admission valve to an extent suitable for governor control of the prime mover at the lower load level.

Reduction in temporary pressure in the space, at 37, after rapid closing of the admission valve, is preferably secured by means of a movable abutment 52 forming part of the expansible chamber 53, the bellows 54 providing for movement of the abutment and also forming a part of the expansible chamber wall. The abutment carries a stem 55 arranged to contact with the cantilever spring 46 to relieve the pressure exerted on the cup valve. A load spring 56 opposes movement of the abutment 52 in response to pressure supplied to the chamber 53.

Fluid under pressure is supplied to the expansible chamber 53 by means of a passage 57 having an orifice 58 whose flow area may be varied by the needle valve 59. The needle valve is adjusted to secure movement of the abutment 52 to suit the closing rate of the governor.

The length of the stem 55 may be varied to change the clearance H between its upper end and the cantilever spring when the abutment 52 is in its lowermost position, the stem preferably comprising threaded sections 57a and 58a which are relatively adjustable for this purpose.

The final load is determined by the adjustment of the initial clearance H. If the loading of the spring 56 were zero and the stem were adjusted to reduce the clearance H to zero, the full fluid pressure in the chamber 53 would be transmitted to the cantilever spring 46 immediately. If the stem is shortened to provide clearance H, then the spring 56 and the bellows will be compressed when the stem contacts the cantilever spring; and, in consequence, the final pressure held by the relief valve 45 will be greater than in the first case and the governor will stop at a smaller turbine load. A longer time will also be required for the bellows to rise than in the first case, which is as it should be, because it takes the governor longer to reach its low load position.

In Fig. 2, there is shown an alternative arrangement whereby a fly-ball governor is used instead of the transformer governor, as shown in Fig. 1. The fly-ball governor, at 60, is pivotally connected, at 61, to a lever 62, the latter being pivotally connected, at 63, to the operating piston rod of the servo-motor at 15, the latter having its operation controlled as before by a pilot valve 22.

The pilot valve has an extension rod 65, which is spring-connected in both directions to the lever 62, there being springs 66 and 67 arranged above and below the lever and between the latter and abutments 68 and 69 of the rod 65.

The relay or pilot valve 22 has a lower extension rod 70 connected to the pressure abutment 71 which cooperates with the bellows 72 and the receptacle 73 to form an expansible chamber 74.

The expansible chamber 74 is connected to a conduit or passage 40 of time-delay pressure controlling means such as shown, at 39, in Fig. 1 and already described.

From the foregoing, it will be apparent that I have devised, in connection with a governing system comprising a governor, its relay, the admission valve operated by the relay, and the follow-up mechanism between the relay operating piston and the piston valve and including a spring link whose force opposes the governing force and normally balances the latter with the piston valve in neutral position, auxiliary apparatus or equipment, at 39, which is rendered effective in response to rate of change of sudden load drop to close the admission valve quickly and then to reopen it to a position suitable for the final load. While the auxiliary apparatus does not speed up the over-all operation, it does hasten events where rapid operation is required. Assuming a given load drop, this requires a movement of the admission valve from a first position for the initial load to a second position for the final load irrespective of the time within which load change occurs. While the governing system is quite rapid, a duration of load drop is finally reached, that is, a sudden load drop, where the governor action is too slow; and, it is on this account that the auxiliary apparatus, at 39, is added to the governing system, the auxiliary apparatus acting in response to rate of change of sudden load drop to move the admission valve quickly from the first position to closed position and then to move the valve from closed position to second position. In other words, instead of the valve being moved from its first position directly to its second position by the governor system, as is done where the duration of load change falls within the capacity of the governor system, in case of sudden load drop, this movement from first position to second position is effected by the auxiliary apparatus independently of the governor but with the difference that, instead of moving the valve directly from first to second position, it is moved from first position beyond second position to closed position and then back to second position, these movements occurring so rapidly that, with very sudden load drops, the supply of steam to the prime mover is so restricted as to prevent objectionable overspeeding. The auxiliary apparatus is also constructed and arranged so that, while valve movements, particularly the closing movement, are effected quite rapidly, nevertheless the over-all time of operation may be made to approximate that of governor travel for admission valve movement from the first to the second position.

The auxiliary equipment, at 39, includes a device effective to provide the temporary pressure for closing the admission valve, means responsive to rate of change of sudden load drop to render the device effective, and means for reducing the temporary pressure for movement of the admission valve to a position suitable for the final load. The device includes the temporary pressure space, at 37, supplied with fluid through an orifice 43 from any suitable source 44 and having an escape port 42, together with a cup valve 45 loaded in closed relation with respect to the discharge end of the port 42 by means of a spring 46, the threaded stem 47 providing for adjustment of the loading pressure exerted by the load spring. The means for normally maintaining the spring with the valve 45 open to prevent the development of pressure in the space, at 37, but responsive to rate of change of sudden load drop to render the device effective is comprised by the abutment 48 normally held in elevated position by the spring 49 to move the load spring 46 upwardly and open the valve together with the wattmeter device, at 51, responsive to the rate of change of sudden load drop to energize the solenoid 50 to draw the abutment 48 downwardly, thereby permitting the spring 46 to move the cup valve into closed relation with respect to the port 42 to render said device effective to provide the temporary pressure. As the final load is reached, the solenoid 50 is deenergized and the spring 49 then moves the load spring 46 upwardly and opens the valve 45, thereby suddenly relieving the temporary pressure in the space, at 37, and preventing the development of any appreciable pressure therein until the valve 45 is again brought into closing relation with the port 42 due to energization of the solenoid 50. Assuming that the device has operated to provide temporary pressure sufficient to close the admission valve, then it is desirable that operation of the device be modified so that it is effective to move the admission valve from closed position to a position suitable for the final load. Accordingly, means is employed in connection with the load spring 46 for reducing the load pressure exerted thereby on the valve 45 with the result that the temporary pressure may be reduced within the regulating pressure range and to a value, which, in cooperation with the follow-up spring 35, provides for a reduced temporary pressure to act on the relay piston valve to operate the relay to move the admission valve to a position suitable for the final load. The last-named means comprises the pressure chamber supplied with fluid through the orifice 58 from the temporary pressure space, at 37, a movable pressure abutment 52, a load spring 56 opposing fluid pressure force applied to the abutment, and a stem 55 carried by the abutment and whose upper end is engageable with the load spring 46 to reduce the loading of the latter exerted on the cup valve 45. Speed of movement of the abutment 52 of the pressure-responsive means to suit that of the governor is provided for by means of the adjustable orifice 58, the distance of governor travel is cared for by adjustment of the stem 55 of the pressure-responsive means to vary the clearance H. As the load drop increases thus calling for greater governor travel and further increase in regulating pressure, since the regulating pressure increases with decrease in load and increase in speed of the prime mover, the clearance H is made larger with the result that, not only is the extent of reduction of the temporary pressure reduced so that the reduced temporary pressure may approximately correspond to the regulating pressure at the final load to be effective to position the valve for final load when the latter is reached, but also the time required for the apparatus to reduce the temporary pressure is increased, the time required being that required for the stem 55 to reach the load spring 46 and unload the latter to the desired extent. Thus, it will be seen that the auxiliary apparatus makes it possible for admission valve closing and opening events to occur quite rapidly so that the apparatus as a whole is capable of effecting desired strokes in a minimum of time with a given size of pilot valve or relay and a given oil pressure, that is, the inability of the governing system, though the latter is quite rapid, to effect desired operation in case of sudden load drop is overcome by the use of the auxiliary equipment for effecting such operations as are required to be done speedily, the auxiliary equipment including means, which, while effecting these events rapidly, provides for over-all operation thereof corresponding to governor travel in moving the admission valve from initial to final position.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In combination, a relay comprising an operating piston having a range of movement in opposite directions, a pilot valve, pressure-responsive means controlling the pilot valve, a follow-up lever connected to the operating piston, and a spring link connecting the lever and the pilot valve; a speed governor for supplying fluid under governing pressure to the pressure-responsive means and providing a governing pressure range sufficient for movement of said operating piston through its full range in opposite directions; a device providing and supplying to the pressure-responsive means a controlling pressure which is sufficiently higher temporarily than the maximum governing pressure to effect operation of the relay to bring the operating piston to one extreme position; and means responsive to the temporarily high controlling pressure for reducing it a desired interval after its establishment.

2. In combination, a relay comprising an operating piston having a range of movement in opposite directions, a pilot valve, pressure-responsive means controlling the pilot valve, a follow-up lever connected to the operating piston, and a spring link connecting the lever and the pilot valve; a speed governor for supplying fluid under governing pressure to the pressure-responsive means and providing a governing pressure range sufficient for movement of said operating piston through its full range in opposite directions; a device providing and supplying to the pressure-responsive means a controlling pressure which is sufficiently higher temporarily than the maximum governing pressure to effect operation of the relay to bring the operating piston to one extreme position; means responsive to said controlling pressure of temporarily higher value for terminating it at the end of an interval of time following its establishment; and means providing for variation in said time interval.

3. In combination, a relay comprising an operating piston having a range of movement in opposite directions, a pilot valve, a pressure-responsive device controlling the pilot valve, a follow-up lever connected to the operating piston, and a spring link connecting the lever and the pilot valve; a speed governor for supplying fluid under governing pressure to the pressure-responsive device and providing a governing pressure range sufficient for movement of said operating piston through its full range in opposite directions; and apparatus for developing and supplying to said pressure-responsive device a controlling pressure which is sufficiently higher temporarily than the maximum governing pressure to effect operation of the relay to bring the operating piston to one extreme position; said apparatus including biasing means for exerting force to develop controlling pressure dependent upon the latter, means for normally holding said biasing means in retracted position so that it is ineffective to exert force to develop controlling pressure and releasable to develop such pressure, and means responsive to controlling pressure a desired time interval after development thereof to relieve the pressure-developing force exerted by the biasing means.

4. The combination as claimed in claim 3 wherein the pressure-responsive device includes means for varying the time interval.

5. The combination as claimed in claim 3 wherein the pressure-responsive device includes means for varying the extent to which the pressure-developing force is relieved.

6. The combination as claimed in claim 3 wherein the pressure-responsive device includes means for varying the time interval and for varying the extent to which the pressure-developing force is relieved.

7. In combination, a relay comprising an operating piston having a range of movement in opposite directions, a pilot valve, pressure-responsive means controlling the pilot valve, a follow-up lever connected to the operating piston, and a spring link connecting the lever and the pilot valve; a speed governor for supplying fluid under governing pressure to the pressure-responsive means and providing a governing pressure range sufficient for movement of said operating piston through its full range in opposite directions; and apparatus for developing and supplying to said pressure-responsive means a controlling pressure which is sufficiently higher temporarily than the maximum governing pressure to effect operation of the relay to bring the operating piston to one extreme position; said apparatus including means providing a passage having one end connected to the pressure-responsive means and having its other end open, means including an orifice for supplying fluid under pressure to said passage, a valve in covering relation with respect to the open end of the passage, means for biasing the valve in a closing direction, means normally effective to hold the biasing means and the valve in retracted position to prevent the development of such controlling pressure and releasable to provide for development thereof, a pressure-responsive device including a movable element having a stem for exerting force on the biasing means in opposition to its bias after traversing a clearance, and means including an adjustable orifice for supplying fluid from said passage to said pressure-responsive device.

8. In combination, a relay comprising an operating piston having a range of movement in opposite directions, a pilot valve, pressure-responsive means controlling the pilot valve, a follow-up lever connected to the operating piston, and a spring link connecting the lever and the pilot valve; a speed governor for supplying fluid under governing pressure to the pressure-responsive means and providing a governing pressure range sufficient for movement of said operating piston through its full range in opposite directions; and apparatus for developing and supplying to said pressure-responsive means a controlling pressure which is sufficiently higher temporarily than the maximum governing pressure to effect operation of the relay to bring the operating piston to one extreme position; said apparatus including means providing a passage communicating at one end with said pressure-responsive means and open at its other end, means including an orifice for supplying fluid under pressure to said passage, a valve arranged in covering relation with respect to the open end of the passage, a spring for exerting force on the valve in a closing direction, means normally effective to hold said spring and the valve retracted to prevent development of said controlling pressure and releasable to develop such pressure, a pressure-responsive device including an expansible chamber defined in part by an abutment movable against the force of a load spring and having a thrust stem adapted, after traversing a clearance, to come into abutment relation with respect to the first spring to relieve the closing force of the latter, means including an adjustable orifice for supplying fluid from said passage to said expansible chamber, and means providing for adjustment of the length of said thrust stem.

9. In combination, a relay comprising an operating piston having a range of movement in opposite directions, a pilot valve, pressure-responsive means controlling the pilot valve, a follow-up lever connected to the operating piston, and a spring link connecting the lever and the pilot valve; a speed governor for supplying fluid under governing pressure to the pressure-responsive means and providing a governing pressure range sufficient for movement of said operating piston through its full range in opposite directions; and apparatus for developing and supplying to said pressure-responsive means a controlling pressure which is sufficiently higher temporarily than the maximum governing pressure to effect operation of the relay to bring the operating piston to one extreme position; said apparatus including means providing a passage having one end communicating with said pressure-responsive means and having its other end open, means including an orifice for supplying fluid under pressure to said passage, a valve arranged in covering relation with respect to the open end of said passage, a leaf spring for exerting force on the valve in a closing direction to develop controlling pressure, means for normally holding the leaf spring and the valve in retracted position to prevent development of said controlling pressure and releasable to develop such pressure, and means responsive to controlling pressure a predetermined time after its development to relieve the closing force of the leaf spring to a desired extent.

10. In combination, a relay comprising an operating piston having a range of movement in opposite directions, a pilot valve, pressure-responsive means controlling the pilot valve, a follow-up lever connected to the operating piston, and a spring link connecting the lever and the pilot valve; a speed governor for supplying fluid under governing pressure to the pressure-responsive means and providing a governing pressure range sufficient for movement of said operating piston through its full range in opposite directions; and apparatus for developing and supplying to said pressure-responsive means a controlling pressure which is sufficiently higher temporarily than the maximum governing pressure to effect operation of the relay to bring the operating piston to one extreme position; said apparatus including means providing a passage having one end communicating with said pressure-responsive means and having its other end open, means including an orifice for supplying fluid under pressure to said passage, a valve arranged in covering relation with respect to the open end of said passage, a leaf spring, a stem carried by the leaf spring and connected to the valve so that the leaf spring may exert force on the valve in a closing direction to develop controlling pressure, means providing for adjustment of the stem relative to the leaf spring to vary the biasing effect of the latter on the valve, means for normally holding the leaf spring and the valve in retracted position to prevent development of said controlling pressure and releasable to provide for development thereof, a pressure-responsive device including a movable element having a stem for exerting force on the leaf spring in opposition to its bias after traversing a clearance, means providing for length adjustment of said stem, and means including an adjustable orifice for supplying fluid from said passage to said pressure-responsive device.

OZRO N. BRYANT.